United States Patent [19]

Bamford et al.

[11] Patent Number: 5,499,367
[45] Date of Patent: Mar. 12, 1996

[54] SYSTEM FOR DATABASE INTEGRITY WITH MULTIPLE LOGS ASSIGNED TO CLIENT SUBSETS

[75] Inventors: Roger J. Bamford, Woodside; Forrest W. Howard, Berkeley; Dirk A. Kabcenell, Portola Valley; Robert N. Miner, San Francisco, all of Calif.

[73] Assignee: Oracle Corporation, Redwood Shores, Calif.

[21] Appl. No.: 330,100

[22] Filed: Oct. 27, 1994

Related U.S. Application Data

[63] Continuation of Ser. No. 792,787, Nov. 15, 1991, abandoned.

[51] Int. Cl.$^6$ .................................................. G06F 17/30
[52] U.S. Cl. ................................ 395/600; 364/DIG. 1; 364/282.1; 364/282.4
[58] Field of Search ..................................... 395/650, 575, 395/600

[56] References Cited

U.S. PATENT DOCUMENTS

| | | | |
|---|---|---|---|
| 4,648,031 | 3/1987 | Jenner ...................................... | 395/575 |
| 4,819,159 | 4/1989 | shipley et al. .......................... | 395/575 |
| 4,878,167 | 10/1989 | Kapulka et al. ......................... | 395/575 |
| 4,897,781 | 1/1990 | Chang et al. ............................ | 395/575 |
| 5,008,853 | 4/1991 | Bly et al. ................................. | 395/153 |
| 5,095,421 | 3/1992 | Freund .................................... | 395/650 |
| 5,140,689 | 8/1992 | Kobayashi ............................... | 395/575 |
| 5,165,031 | 11/1992 | Pruul et al. .............................. | 395/575 |
| 5,201,044 | 4/1993 | Frey, Jr. et al. ......................... | 395/575 |
| 5,222,217 | 6/1993 | Blount et al. ............................ | 395/325 |
| 5,225,977 | 7/1993 | Hooper et al. ........................... | 364/401 |
| 5,261,089 | 11/1993 | Coleman et al. ......................... | 395/600 |
| 5,276,876 | 1/1994 | Coleman et al. ......................... | 395/650 |
| 5,327,556 | 7/1994 | Mohan et al. ............................ | 395/600 |
| 5,363,505 | 11/1994 | Maslak et al. ........................... | 395/650 |

OTHER PUBLICATIONS

Kumar, "A Crash Recovery Algorithm Based on Multiple Logs that Exploits Parallelism", Proc. Second IEEE Symposium on Parallel and Distributed Computing, 9–13 Dec. 1990, pp. 156–159.

Levy, "Incremental Restart", Proc. Seventh International Conference on Data Engineering, 8–12 Apr. 1991, pp. 640–648.

*Primary Examiner*—Thomas G. Black
*Assistant Examiner*—Wayne Amsbury
*Attorney, Agent, or Firm*—Blakely, Sokoloff, Taylor & Zafman

[57] ABSTRACT

The present invention provides a distributed log system where the logs are distributed on a per client basis. That is, the clients are partitioned into subsets. Each subset of clients is assigned a log, and the the redo records of those clients are maintained in that log. This reduces contention bottlenecks, because the number of clients writing to any one log is limited. Also, all of a client's changes are stored in a single log. During a recovery process, the changes for a block of data may be stored in different logs. For proper recovery, the changes must be applied to the database in the order in which they were originally made. The present invention provides a system for ordering the log entries in the correct order by using a "sequence number". Each page of data in the database has an associated sequence number. When a change is made to that page, the sequence number is incremented. The new sequence number is written to the log along with the change information. To minimize overhead, the sequence number is structured as a two part value. The first part of the value is an "incarnation number" that is increased whenever the associated change assigns a new value to the entire data block that is independent of its prior value, such as the change that initiates a block.

66 Claims, 11 Drawing Sheets

FIG. 7A

| JOHN 702 | $10,000 703 |
| FRED 704 | $11,000 705 |

| JOHN 702 | $12,000 703 |
| FRED 704 | $11,000 705 |

| JOHN 702 | $12,000 703 |
| SAM 704 | $11,000 705 |

| MARY 708 | 3 DAYS 709 |
| SUE 710 | 2 DAYS 711 |

| MARY 708 | 4 DAYS 709 |
| SUE 710 | 2 DAYS 711 |

3 706 | 2 707 | 701

| 1 | 17 | FRED | 10K | ROW 1
|---|---|---|---|
| 801 | 802 | 803 | 804 |

| 1 | 23 | JOHN | 9K | ROW 2
|---|---|---|---|
| 805 | 806 | 807 | 808 |

| FRED | 10K |
|---|---|
| 803 | 804 |

| JOHN | 9K |
|---|---|
| 807 | 808 |

| 1 | 7 |
|---|---|
| 809 | 810 |

| EMPLOYEE SALARIES | |
|---|---|
| | 812 |
| 1 | 15 |
| 813 | 814 |
| JONES, 11K | |
| | 815 |
| FRED, 10K | |
| | 816 |
| JOHN, 9K | |
| | 817 |
| ⋮ | |
| TOM, 10K | |
| | 818 |
| BOB, 12K | |
| | 819 |

FIG. 8C

SYSTEM FOR DATABASE INTEGRITY WITH MULTIPLE LOGS ASSIGNED TO CLIENT SUBSETS

This is a continuation of application Ser. No. 07/792,787 filed on Nov. 15 1991 and now abandoned.

BACKGROUND OF THE INVENTION

1. Field of the Invention

This invention relates generally to the field of databases, and in particular to a method for ensuring the integrity of a database.

2. Background Art

A database is an ordered collection of data. A database system allows one or more data users, referred to as "clients" to add to, change, read from, delete, and/or otherwise manipulate the data of the database. A database management system is utilized to control the storage, retention and retrieval of data by clients in a database.

In a computer system, the database is often stored on a permanent storage system, such as a magnetic, optical, or magneto-optical disk drive. The term "permanent storage system" refers to a storage system that is used to retain data over long periods of time, in spite of power interruptions and some other failures. A disk dive is an example of such a permanent storage system. If data is stored in a nonvolatile memory, such as on a Winchester disk drive, and the disk drive is turned off or otherwise powered down and then turned back on, the data is still available. This is in contrast to temporary storage systems, such as most dynamic random access memory (DRAM). If data is stored in a typical DRAM system (without battery power), and the DRAM is turned off and then turned back on, the data is no longer available.

A client in a computer implemented database may be a human user, a processor, or a program executed on a processor. A client is any entity that can make a "transaction" with the database. A transaction is a sequence of operations that allow a client access to the database to read data, delete data, add new data, update or modify existing data. A transaction begins with an operation referred to as BEGIN operation and ends with either a COMMIT operation or a ROLLBACK operation. A COMMIT operation signifies the completion of a successful transaction. A ROLLBACK operation signifies the unsuccessful termination of a transaction.

In a typical computer-implemented database system, a transaction is not performed on the "original data" (i.e. the data stored on the permanent storage system), but is performed on a copy of the data. For example, when a client accesses a block of data from a database, a copy of the data is retrieved from the database and is stored in a temporary storage location, referred to as a "buffer". The client then may read, update, modify, replace or delete the block of data. The results of the transaction are effected on the original block of data at a later time. This is done because, typically, it is not possible to modify individual bytes in the permanent storage system; an entire block must be written at once. A typical database system utilizes a number of buffers to allow the transactions of multiple clients to be performed. As a result, there may be a number of transactions waiting to be executed on the original data at any one time. The delay in time between the execution of a transaction on data in a buffer and the execution of that transaction on the original data can affect the "integrity" of the database. The integrity of a database refers to its accuracy and reliability. A database has integrity if all outstanding client transactions have been executed in the correct order on the original data.

There are a number of factors that make it difficult to maintain the integrity of a database. First, when multiple clients access a database, a method to avoid harmful interaction among the clients must be provided. When multiple clients make changes to the database, the changes made by each client may be interrelated and must be applied to the database in the proper sequence across clients to preserve their relationship. Another factor that increases the difficulty of preserving the integrity of a database is that computer systems do not exhibit perfect reliability and components of a computer system occasionally fail, (e.g. the disk drive fails, the processor fails, there is a system failure, a power failure, etc.). Changes by clients to the database made before, during or after the failure must be applied to the database in the proper sequence to ensure database integrity.

When a database system failure occurs, a "recovery" operation is required. A recovery in a database system means recovering the database itself. That is, restoring the database to a state that is known to be consistent and reasonably recent. This is sometimes accomplished by restoring the database from a back-up copy of the contents of the database. The back-up copy is a duplicate copy of the original database that is made periodically.

A disadvantage of recovering a database from a backup copy is that the backup copy may not reflect transactions that occurred after the time the backup was made and before the failure of the database system. It is desired to be able to recreate those missing transactions to avoid the duplication of work that has already been performed on the database. This requires that the transactions be "persistent". Persistence refers to the retention of sufficient redundant information about a transaction to recreate the effects of the transaction at a later time, in the event that a failure causes loss of the primary copy of the data written by the transaction.

One prior art method used to ensure the persistence of changes involves sequentially writing short records containing information sufficient to redo the changes to a "log." The log provides a record of changes that can survive a database system failure. Thus, the persistence of the changes is provided.

A database system that uses a log to store redo records is illustrated in FIG. 1. The database system of FIG. 1 consists of a plurality of clients 101, 102 and 103 coupled to a database controller 104. The database controller includes a plurality of cache buffers 107–112, and a log buffer 113. The database controller is coupled to permanent storage devices 105 and 106. In the example of FIG. 1, storage device 105 stores log information and storage device 106 stores the original database data.

When a client reads information, a BEGIN operation is executed, the information is located in database 106 and transferred to one of cache buffers 107, 108, 109, 110, 111 or 112. The information is provided to the appropriate client from the proper cache buffer. When the client has read the information, a COMMIT operation is executed and the cache buffer is released for use by another client. No changes are recorded in database 106 since a read operation does not alter the original data. Correspondingly, a log entry is not required because there is no need to recreate a read transaction in the event of a failure.

When a client writes information, the information is first written to cache buffer 107, 108, 109, 110, 111 or 112. When all of the information to be added has been entered into the cache buffer, a log entry is produced and written to log buffer 113. When the client executes a COMMIT operation, the log entry is written to log 105. At some later time, an attempt is made to add the information to database 106. If this attempt fails, (or if some earlier failure prevents the attempt from taking place), the log entry in log 105 can be used as a redo record to "redo" the failed transaction.

When a client changes or deletes information in the database, the record containing the information to be changed is first located in database 106. The record is copied into a cache buffer 107, 108, 109, 110, 111 or 112. The client makes appropriate changes to the cache buffer containing the information. When all of the changes have been made to the information in the cache buffer, a log entry is produced and placed in log buffer 113. After a COMMIT operation, the log entry is then written to log 105. An attempt is made to write the updated record back to database 106 to replace the old record. If this attempt fails, (or if some earlier failure prevents the attempt from taking place), the log entry in log 105 is used as a redo record to "redo" the failed transaction.

The log system of FIG 1 has the disadvantage that, in a high-performance system, the log can become a bottleneck. The size of the redo records can exceed the transfer rate capability of the device on which the log is stored. The performance of the system cannot be increased without increasing the transfer rate of the storage device.

Consider the example when a transaction log is kept on a disk drive. Assuming a rotation rate of approximately 4,000 RPM, positioning time of 3.5 to 32 milliseconds, 56 sectors per track and 512 bytes per sector, the optimal throughput of this disk drive is between 610 to 1,550 kilobytes per second supporting a transaction rate of 508 to 1,292 transactions per second (assuming that each transaction requires approximately 1.2 kilobytes of log information). In a high performance system, such as a parallel processor system, tens of thousands of transactions per second can be achieved. In such a system, a single log device is the limiting factor in performance.

One prior art attempt to overcome the transfer rate limitation is to provide multiple logs, each stored on a different device. The aggregate transfer rate of all logs is greater than the transfer rate of a single device. The division of the log into multiple components is typically accomplished in the following manner. The database is partitioned and a separate log is maintained for each partition. As a result, all records for a single partition are contained in one log. However, performance can still be limited when a number of clients are writing into the same partition, resulting in contention bottlenecks. In addition, a client that writes to several partitions must correspondingly write to several logs, adding complexity and consuming time.

A system implementing a partitioned database with a separate log for each partition is illustrated in FIG. 2. A plurality of clients 201–206 are coupled to a database router 207, which is in turn coupled to database controllers 236 and 237. The single database 106 of FIG. 1 is divided or "partitioned" into two separate database partitions 211 and 212 in the example of FIG. 2, which are managed by database controllers 236 and 237, respectively. These partitions may be actual physical partitions where separate disk drives, for example, are used to store different sections of the database. Alternatively, the partition may be logical, based on address locations.

Each partition 211 and 212 has associated cache buffers and log buffers within database controllers 236 and 237, respectively. Database controller 236 includes cache buffers 214–219 and log buffer 232. Log buffer 232 communicates with permanent log storage 208 and database partition 211. Database controller 237 includes cache buffers 220–225 and log buffer 233. Log buffer 233 communicates with permanent log storage 209 and database partition 212.

When a client reads information, the request is routed by database router 207 to one of the database controllers 236 or 237, and the information is located in one of database partitions 211 or 212. The information is then transferred to one of the cache buffers associated with the particular database partition. For example, if client 203 reads a record from partition 213, a copy of the record is stored in one of cache buffers 226–231. The information is provided to client 203 from the cache buffer. When the client has read the information, the cache buffer is released to the system. No log entry is required since a read operation does not alter the information.

Consider the case when client 202 writes information to partition 211. Client 202 writes the desired data to one of the cache buffers 214–219 in buffer partition 236 (associated with partition 211). After the data to be written is entered into a cache buffer, a log entry is created and stored in log buffer 232. After a COMMIT operation is executed by the client 202, the log entry in log buffer 232 is written to the log storage 208 associated with that partition. At a later time, the contents of the cache buffer are written to the appropriate location in database partition 211. If there is a system failure prior to the entry of the data into the database partition 211, the log entry stored in log 208 can be used to redo the write operation.

Now consider the example of when client 202 modifies or deletes data from database partition 212. The record to be modified or deleted is located in database partition 212 and a copy is written to one of cache buffers 220–225 in partition 237 (associated with database partition 212). Client 202 executes the appropriate modifications or deletions on the data in the cache buffer and a log entry is written to log buffer 233. When client 202 executes a COMMIT instruction, the log entry in log buffer 233 is written to permanent log storage 209. Subsequently, the modifications or deletions are affected on the original data stored in database partition 212.

FIG. 2 shows a design in which each partition 211 or 212 is managed by a separate database controller 236 or 237, respectively. However, the same principles apply if all partitions are managed by the same database controller. In this case, specific cache buffers may be set aside for each partition; or, alternatively, a common set of cache buffers may be used for blocks in all partitions.

There are a number of disadvantages associated with the partition-based log system of FIG. 2. Because, in a series of operations, a client may write to one or more partitions, the log entries associated with transactions for that client are stored in different logs. To ensure data integrity, coordination is necessary to ensure that the changes made by a given client in different logs are executed together. Another disadvantage occurs when a plurality of clients are writing to a single partition. In this situation, a bottleneck can occur as in the log system of FIG. 1.

SUMMARY OF THE PRESENT INVENTION

The present invention provides a distributed log system where the logs are distributed on a per client basis. That is, the clients are partitioned into subsets. Each subset of clients is assigned a log, and the the redo records of those clients are maintained in that log. This reduces contention bottlenecks, because the number of clients writing to any one log is limited. Also, all of a client's transactions are stored in a single log, eliminating the need for the coordination required by prior art schemes.

Using the system of the present invention, changes relevant to a block of data may be stored in more than one log. During a recovery process, the changes for that data block must come from different logs. For proper recovery, the changes must be applied to the database in the order in which they were originally made. The present invention provides a system for ordering the log entries in the correct order by using a "sequence number". Each page of data in the database has an associated sequence number. When a change is made to that page, the sequence number is incremented. The new sequence number is written to the log along with the change information. To minimize overhead, the sequence number is structured as a two part value. The first part of the value is an "incarnation number" that is increased whenever the associated change assigns a new value to the entire data block that is independent of its prior value, such as the change that initializes a block.

BRIEF DESCRIPTION OF THE DRAWINGS

FIGS. 7A–7E illustrate the operation of incarnation numbers of the present invention.

FIGS. 8A–8C illustrate different definitions of database "area" in the present invention.

DETAILED DESCRIPTION OF THE INVENTION

A method for distributing log I/O activity is described. In the following description, numerous specific details are set forth in order to provide a more thorough description of the present invention. It will be apparent, however, to one skilled in the art, that the present invention may be practiced without these specific details. In other instances, well known features have not been described in detail so as not to obscure the present invention.

Figure 1:
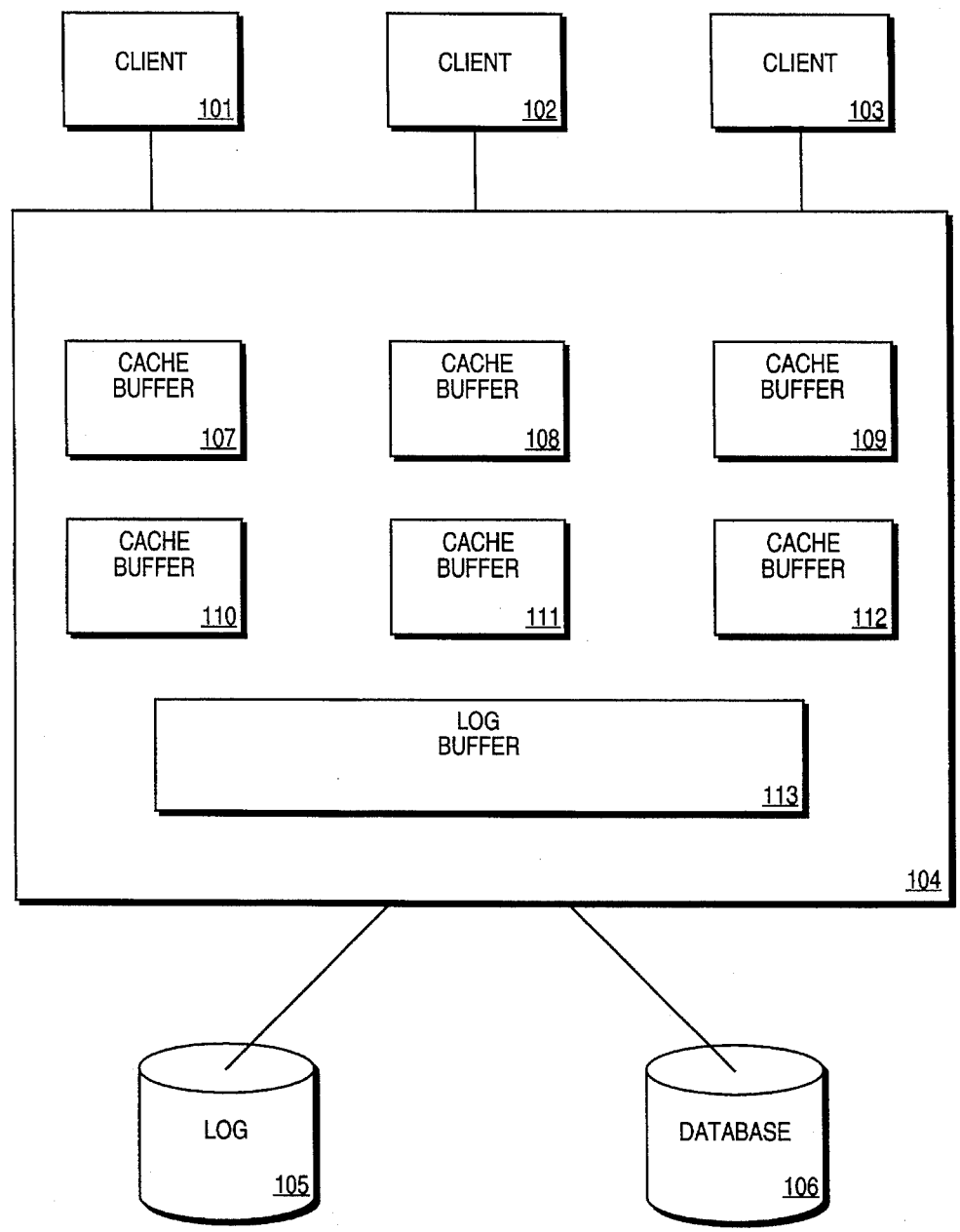
FIG. 1 is a block diagram of a prior art single log database system.
Figure 2:
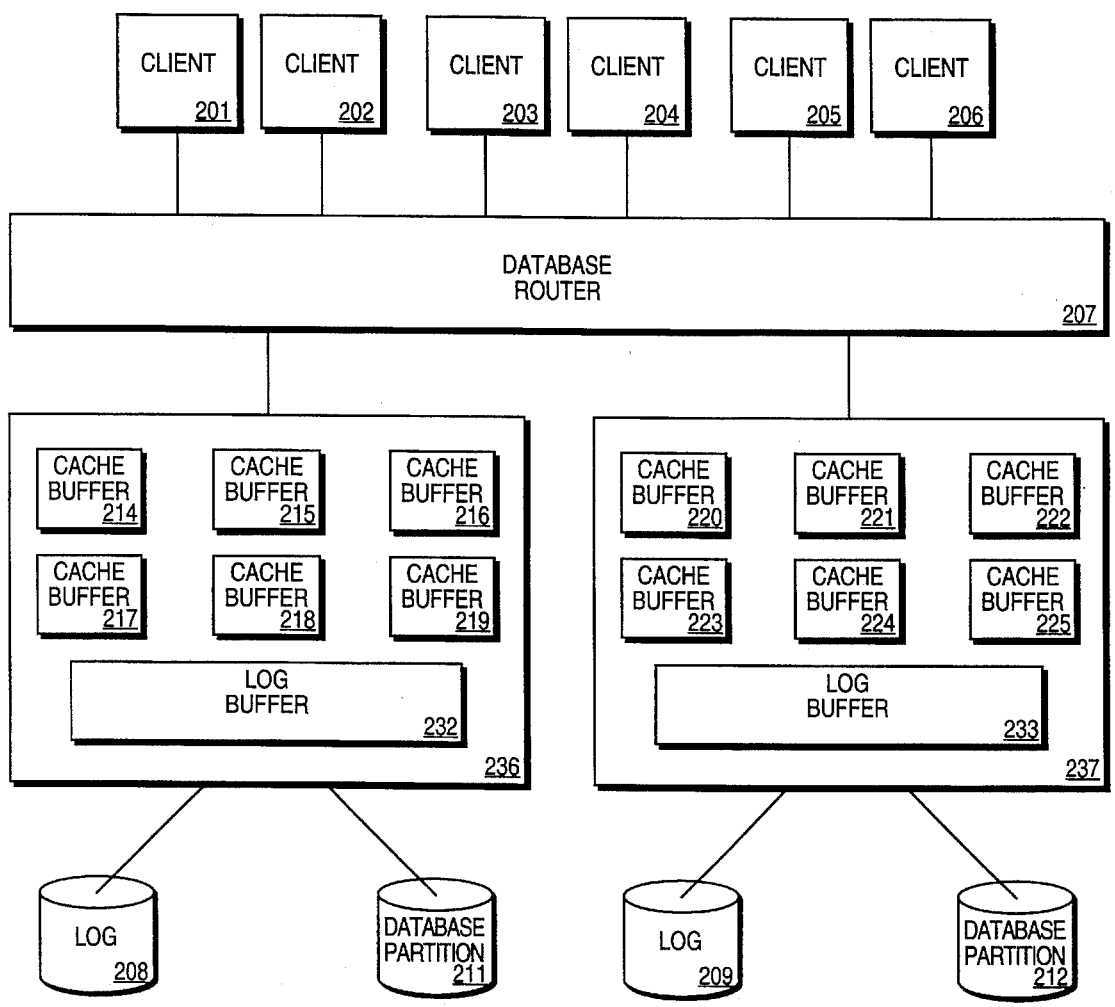
FIG. 2 is a block diagram of a prior art log-by-database-partition system.
Figure 3:
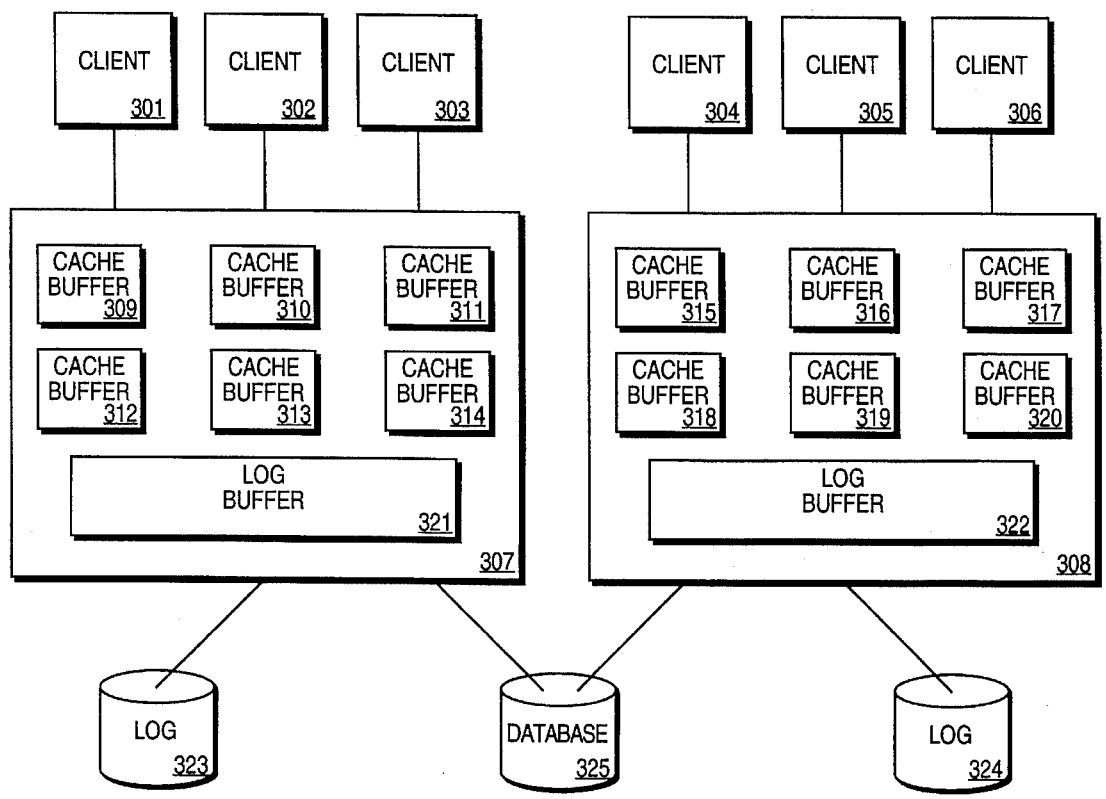
FIG. 3 is a block diagram of the log system of the present invention.

A block diagram of the present invention is illustrated in FIG. 3. In this illustration, the clients are partitioned into subsets of clients. A log buffer is associated with each subset of clients and each subset of clients has its own associated cache buffers. Referring to FIG. 3, clients 301,302 and 303 represent one subset of clients and communicate through database system controller 307 to log 323 and database 325. Controller 307 includes a plurality of cache buffers 309–314 as well as log buffer 321. Log transactions stored temporarily in log buffer 321 are stored permanently on log 323.

Another subset of clients illustrated in FIG. 3 are clients 304, 305 and 306. These clients communicate through controller 308 to database 325 and log 324. Controller 308 includes cache buffers 315–320 and log buffer 322. The log buffer stores log entries in log 324.

As in the prior art, FIG. 3 shows a design in which each set of clients (301,302 and 303) or (304, 305 and 306) is managed by a separate database controller 307 or 308, respectively, and each database controller 307 or 308 contains a single log buffer 321 or 322, respectively, and writes to a single log 323 or 324, respectively. However, the same principles apply if all clients are managed by the same database controller, and that database controller contains more than one log buffer and writes to more than one log. In this case, specific cache buffers may be set aside for each set of clients; or alternatively, a common set of cache buffers may be used for page access by all clients.

Write, read and modify operations of the present invention are described below.

Write Operation

Consider when client 302 writes data to database 325. Client 302 first writes the information to one of buffers 309–314 associated with the partition that includes client 302. After the client has completed writing the data to one of the buffers 309–314, a log entry for the transaction is created and temporarily stored in log buffer 321. When the client has completed its transaction and executed a COMMIT command, the entry in log buffer 321 associated with that transaction is written to permanent log storage 323. At some later point, the contents of the appropriate cache buffer are written to database 325.

When client 304, for example, writes to database 325, the data is provided to one of cache buffers 315–320 since client 304 is in a second subset of clients in the scheme of the present invention. After client 304 has written its data to the buffer, a log entry is stored in log buffer 322 and after a COMMIT command, the log buffer 322 is provided to permanent log storage 324. Subsequently, the data is written to database 325.

Read Operation

During a read operation, data is copied from database 325 into a cache buffer where it may be accessed by a client. The cache buffer selected for the copy of the data depends on the client requesting the read operation. For example, if the subset of clients 301,302 and 303 request information, the data is copied to one of buffers 309–314 associated with that subset of clients. Correspondingly, if one of clients 304, 305 and 306 read data, the data is copied to one of cache buffers 315–320 associated with that subset of clients. No log entry is required for read operation, since the original data is not modified.

Modify or Delete Information

When one of clients 301–303 modifies or deletes a record from database 325, a copy of the record to be modified is stored in one of cache buffers 309–314. The client then modifies or deletes the data and a copy of the transaction is stored in log buffer 321. After a COMMIT operation is executed, the log entry from log buffer 321 is stored in permanent log storage 323. Subsequently, the modification is executed on the original data on database 325.

When a client from subset 304–306 modifies or deletes data, a copy of the data is stored in one of cache buffers 315–320. A log entry for the change is stored in log buffer 322 and eventually in permanent log storage 324.

An advantage of the present invention is that the number of clients that can potentially write into each log is fixed. In the prior art scheme, potentially all clients could attempt to write into a single log if all clients are accessing the same database partition. This is avoided in the present invention. Thus, a "worst case" throughput problem can be determined in advance and appropriate design choices made to provide optimized throughput. Further, each client's entire transaction history is guaranteed to be contained in a single log, eliminating the need for coordination of logs to ensure transaction integrity.

Using the scheme of the present invention, it is possible that the changes relevant to a particular area of the database are located in more than one log. During a recovery operation, the changes to an area (since they are not necessarily independent) should be applied in the same order in which they originally occurred. The present invention provides for the use of a "sequence" number to ensure that changes to an area are applied in a correct order.

Databases typically store data in a subset of the storage device referred to as a "page." A page is a block of data that contains a number of records. When a record in the page is to be accessed, typically the entire page is transferred to a cache buffer, and after a transaction is performed, the entire page is transferred back to the database. In the present invention, each page has an associated sequence number that is incremented each time a change is made. The sequence number is written to the transaction log along with the transaction information. At recovery time, the log entries for a particular page in the database can be sorted in order of the sequence number so that all changes to a given page can be applied in the correct order.

To increment the sequence number, the existing sequence number must be known. This requires that the page being changed be read so that the current sequence number can be identified. In some cases, the initialization of a page, for example, the prior changes are not "interesting". That is, the prior changes do not affect the current change and can be ignored. To require a read of the page to determine the existing sequence number may be unnecessary overhead in such a case.

An alternate embodiment of the present invention provides sequencing information as a two part value, an incarnation number and a sequence number. The sequence number is incremented each time a change is made. The incarnation number is changed to a larger value each time a page is initialized, or some other operation is performed that makes prior changes uninteresting. For example, consider the case where a page of data includes records associated with a particular file such as employee salaries. This file is assigned an incarnation number of one, for example, and the sequence number associated with the page is given a sequence number of one, as well. Whenever a page is initialized, the sequence number is always one, although the incarnation number may change. Each transaction that changes that page increases the sequence number associated with that page. However, the incarnation number remains the same. The incarnation number is kept in a "dictionary" along with other file information, such as its location within the database, and can be read without a page access.

Consider now the case where the file "employee salaries" is deleted, and a new file, such as "employee sick time", for example, is created in its place. When the page is initialized again, the incarnation number is increased to, for example, three, and the sequence number is reset to one. During a recovery operation, all transactions associated with incarnations less than three can be ignored. It does not matter if these changes are not done in the recovery operation, since they will be over-written when the page is initialized, represented by the transactions associated with incarnation number three. This reduces recovery overhead and streamlines operation. In addition, whenever a page is initialized, there is no reason to determine the existing sequence numbers, since the first transaction of an initialization operation is always assigned sequence number one.

An example of the operation of incarnation numbers is illustrated in FIGS. 7A–7E. FIG. 7A is a page of data that includes employee salary information and contains two records. The first record 701 includes a name field 702 and a salary field 703. The second record includes a name field 704 and a salary field 705. The page also includes an incarnation number field 706 and a sequence number field 707. Referring to FIG. 7A, this page is initialized for the employee salary information. Therefore, the incarnation number is one in field 706 and the sequence number is one in field 707. Record 701 includes "John" in the name field 702 and a salary of $10,000 in the salary field 703. The second record includes a name "Fred" in the name field 704 and a salary of $11,000 in the salary field 705. Referring to FIG. 7B, a transaction to the page 701 has occurred. Namely, the salary in field 703 has been changed from $10,000 to $12,000. Because the page has not been initialized, only the sequence number changes from one to two in field 707. The incarnation number one in field 706 remains the same. In FIG. 7C, a second change has occurred. The name "Fred" in field 704 has been changed to "Sam." Again, the sequence number in field 707 is incremented, from two to three, but the incarnation number remains the same, one, in field 706.

In FIG. 7D, the page is initialized and the employee salary records are deleted and employee sick pay records are added. These include new name field 708 and sick day field 709 in the first record, and name field 710 and sick day field 711 in the second record. The name "Mary" is written to field 708 and "three days" is written to field 709. The name "Sue" is written to field 710 and "two days" is written into sick day field 711. Because the page has been initialized, the incarnation number in field 706 is increased from one to a larger value, in this case, three. Whenever a page is initialized, the sequence number returns to one in field 707. Referring now to FIG. 7E, a change in field 709 from three days to four days is made. The incarnation number in field 706 remains the same, but the sequence number in field 707 is incremented from one to two. Although the sequence number may be the same for transactions associated with different incarnations, by using the incarnation number as well, unique identification of each transaction is maintained. In a recovery operation, only those changes associated with incarnation number three need to be made to the database since the transactions associated with incarnation number one are eventually written over when the page is initialized.

The preceding description of the present invention presumes that the areas that are labeled with sequence and incarnation numbers are actually pages of disk storage. However, the present invention is not limited to areas defined in this way. An area can be larger, for example, a file, or smaller, for example, an individual record, and can in fact be any logical or physical subdivision of the database. For the purposes of the present invention, the only requirement is that, to the database controller, an entire area appears as a single unit; that is, a database controller will never "see" an area in which different portions reflect the state of the area at different points in time. FIGS. 8A–8C give examples of different definitions of "areas" within a database.

FIG. 8A illustrates an example of the present invention where an area is defined as an individual row of data. Data block 800 includes two data rows, row 1 and row 2. Row 1 includes its own incarnation number field 801, a sequence number field 802, a name field 803 and a salary field 804. Row 2 includes its own incarnation number 805, a sequence number field 806, a name field 807 and a salary field 808. Consider the case where the $10,000 salary of Fred in row 1 is changed to $12,000. The log entry could appear as follows:

Location: block 800, row 1

Incarnation Number: 1

Sequence Number: 18

Description:
  Type: Update
  Place: Column 2
  Value: $12,000

Note that the sequence numbers of row 1 and row 2 are independent of each other. Each log entry subset has its own sequence number. Since both data subsets are in the same file, they share the same incarnation number.

FIG. 8B illustrates an example of the present invention where an area is defined as a data block. In this case, the data block 800 includes two entries, where the first entry has a name field 803 and a data field 804, and the second entry has a name field 807 and a data field 808. The block 800 also includes a incarnation number field for the entire block 809 and a sequence number field 810, also for the entire block.

Consider again the case where the $10,000 salary in field 804 of Fred in field 803 is updated to $12,000. The transaction log entry may appear as follows:

Location: Block 800

Incarnation Number: 1

Sequence Number: 8

Description:
  Type: Update
  Place: Row 1, Column 2
  Value: $12,000

FIG. 8C illustrates an example of the present invention where an area is defined as an entire file. The file 812 is the employee salaries' file and includes its own incarnation number 813 and sequence number field 814. The file 812 includes a number of records 815–819. Again, consider the case where the salary of Fred is updated from $10,000 to $12,000. The transaction log entry appears as follows:

Location: Employee Salaries

Incarnation Number: 1

Sequence Number; 16

Description:
  Type: Update
  Place: Record 2, Character 8
  Value: 2

(In this case, the eighth character of the record starting at "F" with value "0," is changed to "2".

There are advantages associated with each type of area definition of the examples of FIGS. 8A–8C. The example of FIG. 8A, where each transaction log entry is associated with a logical row of a data block, results in fewer conflicts. This is because the number of clients accessing any one row of data in a data block is likely to be limited. Although there are reduced conflicts for the example of FIG. 8A, there is more overhead in processing power required to track the sequence numbers because there are more sequence numbers to track. This is because each row has its own sequence number.

The example of FIG. 8B, with each transaction log entry associated with a single data block, involves more contention conflicts than the example of FIG. 8A, since there are several data items within a block that may be written to by one or more clients. The likelihood that more than one client will access a data block is greater than the likelihood that more than one client will access an individual row of that data block. However, the overhead for sequence numbers is reduced, since there are fewer sequence numbers to track.

The example of FIG. 8C where each transaction log entry is associated with an entire file, has the greatest potential for contention conflicts of the three examples, since the large amount of data within a file makes it likely that more than one client will be writing to the file at any one time. However, the sequence and incarnation number overhead is reduced, since there are fewer sequence numbers in the overall system.

The present invention may be practiced with any of the area definitions of FIGS. 8A–8C, or with any other definition.

Log Format

The transaction log entries used in the present invention may be of any suitable format. For example, the log format may be of a type that has a fixed length changed data field or of a type that has a variable length changed data field.

Figure 4A:
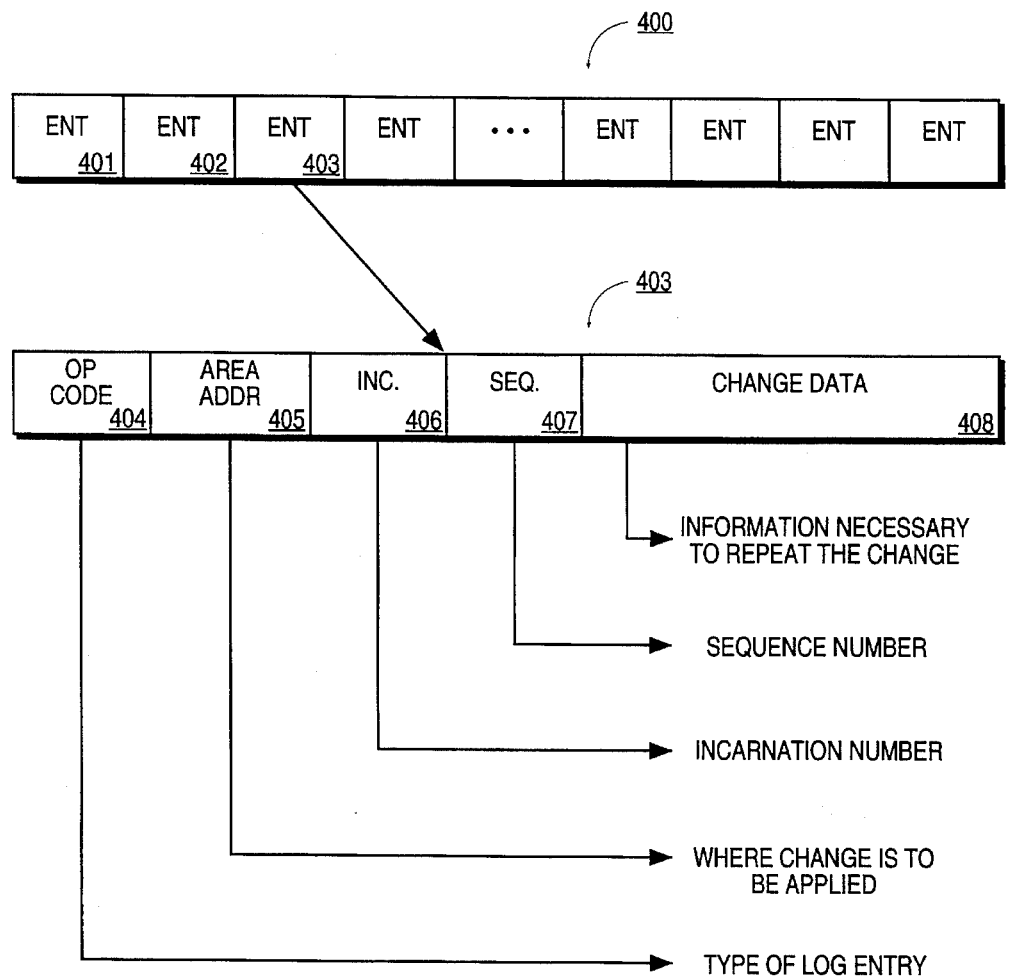
FIGS. 4A and 4B illustrate log entry formats that may be used with the present invention.
Figure 4B:
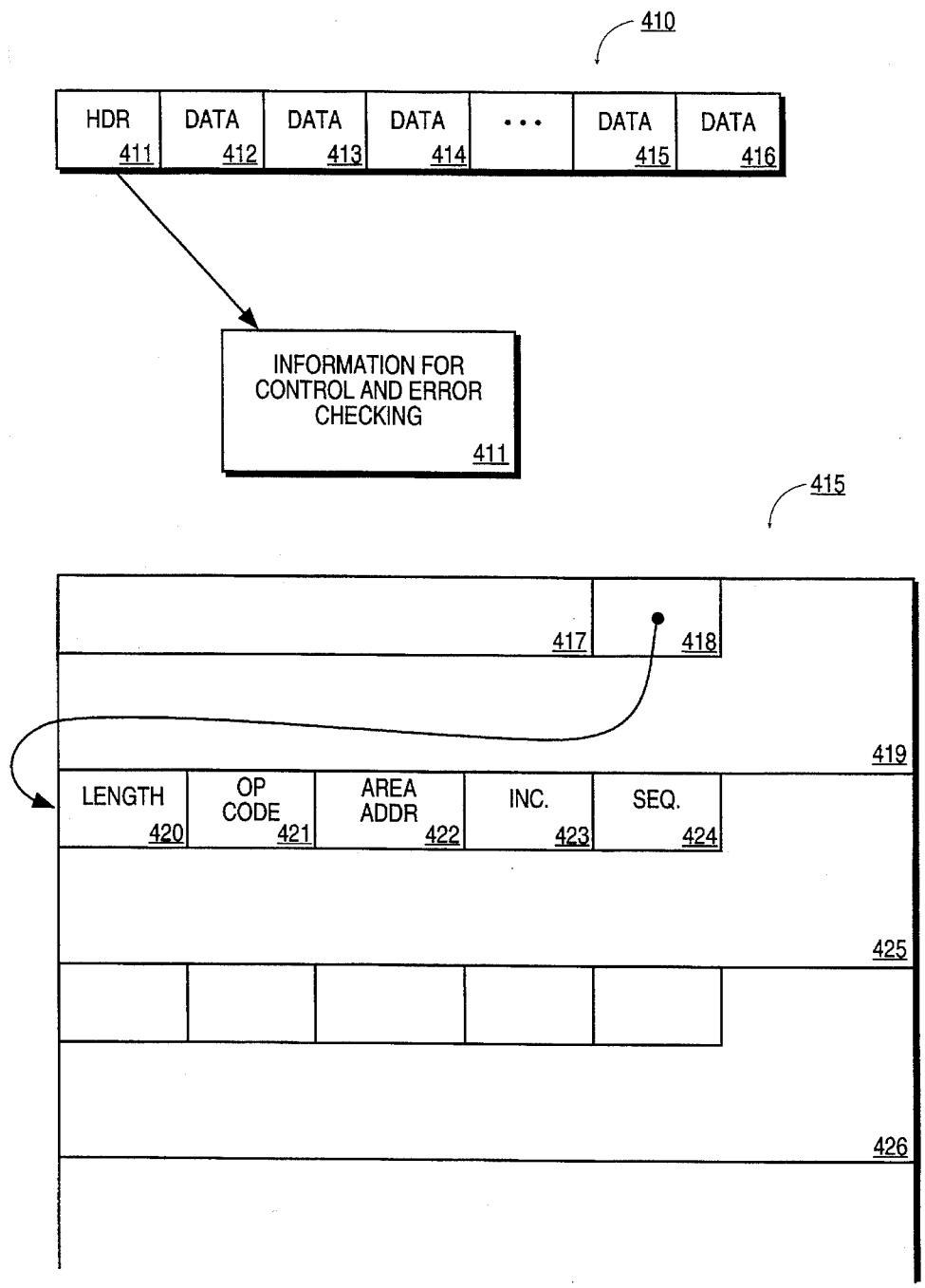

Examples of log formats that may be utilized with the present invention are illustrated in FIGS. 4A and 4B. Referring first to FIG. 4A, an example of a redo log format that has a fixed length changed data field is illustrated. The log 400 is comprised of individual entries 401, 402, 403, etc. Each entry is comprised of a number of fields. For example, entry 403 is shown in expanded form and includes fields 404–408. Field 404 is an operation code field that indicates the type of field entry (e.g., update, delete, add, etc.). Field 405 is the address of the data area (typically a block address) that is to be modified by the transaction for which the log entry has been created. Field 406 is an incarnation number, and field 407 is a sequence number.

The changed data field 408 is a fixed length field that is used to indicate the type of change that is to be performed, such as delete data, change data, write data, etc. The entry in change data field 408 must be sufficiently descriptive that the change for which the original transaction generated the log entry may be recreated in the event of a recovery operation.

A second log format, having a variable length changed data field, is illustrated in FIG. 4B. In this embodiment, the log file 410 is comprised of a header 411 and a plurality of data blocks 412, 413, 414, 415, etc. The header 411 is a redo file header and includes information for control and error checking. A redo data block, such as data block 415, is shown in detail in FIG. 4B. The block includes a redo block header 417 used for error checking and control operations, and a plurality of redo log entries 419, 425, 426, etc. Field 418 in the redo block header points to the first log entry that begins in the particular redo data block. Any entry before this first log entry (entry 419 in FIG. 4B) is a continuation of an entry that began in a previous redo data block.

Block area 425 is the first log entry that starts in this redo data block 415. The log entry begins with a length field 420 that indicates the length of the log entry. The operation code field 421 indicates the type of log entry. The page address field 422 indicates where the change is to be applied. Fields 423 and 424 include the incarnation number and sequence number, respectively. Field 425 is a change data field that contains information used to redo the change, if necessary.

As opposed to the example of FIG. 4A, the system of FIG. 4B provides for a variable length change data field. This field may continue into the next block 416.

Change Page Procedure

Figure 5:
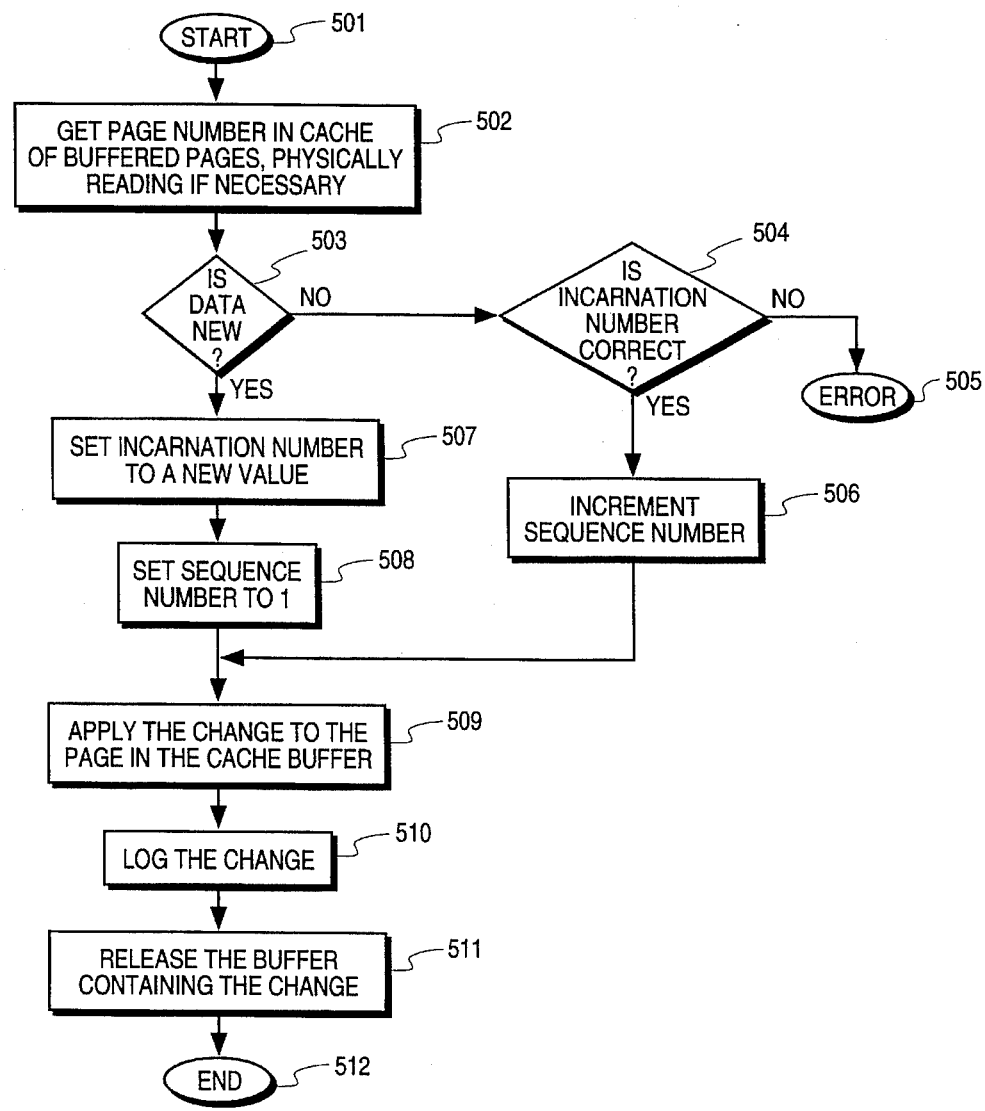
FIG. 5 a flow diagram illustrating the change page procedure of the present invention.

The present invention may be implemented as a series of instructions to be executed by a processing means. An example of instructions that may be used to implement a change to a page of data using the present invention is illustrated in Table 1. These instructions are described by the flow chart of FIG. 5.

The system begins t step 501. At step 502, a page number is obtained in a cache of buffered pages, physically reading the page, if necessary. At decision block 503, the choice "is data new?" is made. If the result is false, the system proceeds to decision block 504 where the choice "is incarnation number correct?" is made. If the result is false, the system proceeds to step 505 and an error is signalled. If the result at decision block 504 is true, the system proceeds to block 506 and the sequence number is incremented for that page. The system then proceeds to step 509.

If the choice at decision block 503 is true (the data will initialize a page), the system proceeds to step 507 and the incarnation number is set to a new value. This occurs when a page is initialized. At step 508, the sequence number is set to one. Whenever a page is initialized, the sequence number is automatically set to one.

At step 509, the client change is applied to the change in the cached buffer. At step 510, the change is logged in the log buffer and a log entry is made in the log buffer. At step 511, the cache buffer containing the page is released for other use and at step 512, the sequence ends.

Recover Data Procedure

After a failure of the database system, the present invention may be used to restore the database to a known state and to redo the changes to the database represented by the entries in the transaction log. This is referred to as a "recover data procedure". An example of instructions that may be used to implement a recover data procedure using the present invention is illustrated in Table 2. These instructions are described by the flow chart of FIGS. 6A and 6B.

Figure 6A:
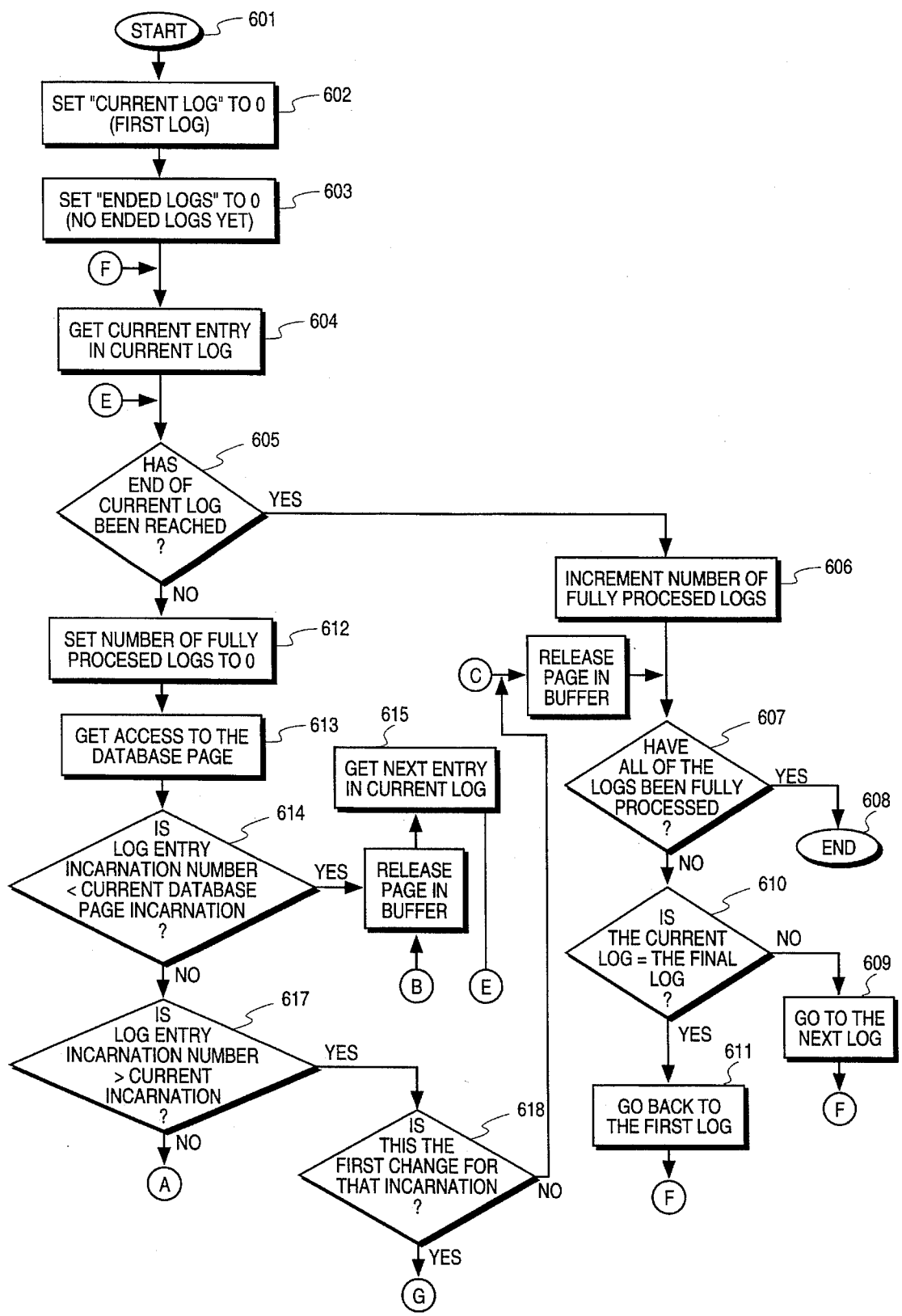
FIGS. 6A and 6B are flow diagrams illustrating recover data procedure of the present invention.
Figure 6B:
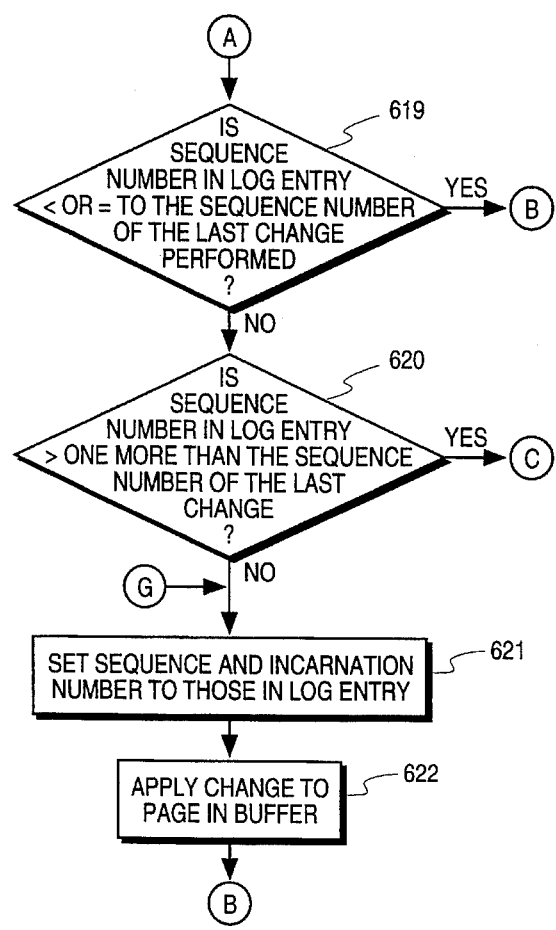

FIGS. 6A and 6B illustrate a flow diagram illustrating the recover steps of the present invention. The system begins at start block 601. At block 602, a current log value is set to zero (indicating that it is the first log). At block 603, the "ended logs" variable is also set to zero (indicating that there have been no ended logs as of yet). At block 604, the system gets the current entry in the current log.

At decision block 605, the choice " has end of current log been reached?" is made. If the result is true, meaning that the end of the log has been reached, the system proceeds to step 606. At step 606, the number of fully processed logs is incremented. This is done to indicate how many of the plurality of logs (one for each client subset) have been processed. At decision block 607, the choice "have all of the logs been fully processed?" is made. If the result is true, the system ends at step 608. If the argument is false, meaning that there are more logs to process, the system proceeds to step 610.

At decision block 610, the choice "is the current log equal to the final log?" is made. If the result is true, the system proceeds to step 611 and goes back to the first log and then re-enters the flow diagram at point F, at step 604. If the argument at decision block 610 is false, the system proceeds to the next log, and then re-enters the flow diagram at point F.

If the result at decision block 605 is false, the end of the current log being reviewed has not been reached and the system proceeds to step 612. At step 612, the number of frilly processed logs is set to zero. At step 613, the system accesses the database page indicated by the log entry.

At decision block 614, the choice "is log incarnation number less than the current DB incarnation?" is made. If the result is true, then the change indicated by the log transaction need not be made, the page buffer is released, and the system proceeds to step 615 and gets the next entry in the current log, and then proceeds to entry point E in the flow diagram.

If the result at decision block 614 is false, the system proceeds to decision block 617 and the choice "is log entry incarnation number greater than current database incarnation?" is made. If the result is true, the system proceeds to decision block 618 and the choice "is this the first change for that incarnation?" (this is detected by a sequence number equal to 1) is made. If the result is false, the system releases the page in buffer and proceeds to decision block 607, because there are changes earlier in this incarnation that must be applied and they are in another log. If the result at decision block 618 is true, the system proceeds to entry point G of the flow diagram. If the result at decision block 617 is false, the system proceeds to entry point A of the flow diagram.

Referring now to FIG. 6B, at decision block 619, the choice "is sequence number in the log entry less than or equal to the sequence number of the last change performed?" is made. If the result is true, then the change has already been processed and the system proceeds to entry point B at step 615, releases the page in the buffer, and gets the next entry in the current log. If the result at decision block 619 is false, the system proceeds to decision block 620.

At decision block 620, the choice "is sequence number in log entry greater than one more than the sequence number of the last change performed?" is made. If the result is true, the system proceeds to entry block C, releasing the page in the buffer, because there are changes in other logs that must be applied first. If the argument at decision block 620 is false, the system proceeds to block 621 and sets the sequence and incarnation numbers to those in the log entry. At block 622, the system applies the change to the page in the buffer. The system then proceeds to entry point B, releases the page in the buffer, retrieves the next entry in the current log.

Figure 9:
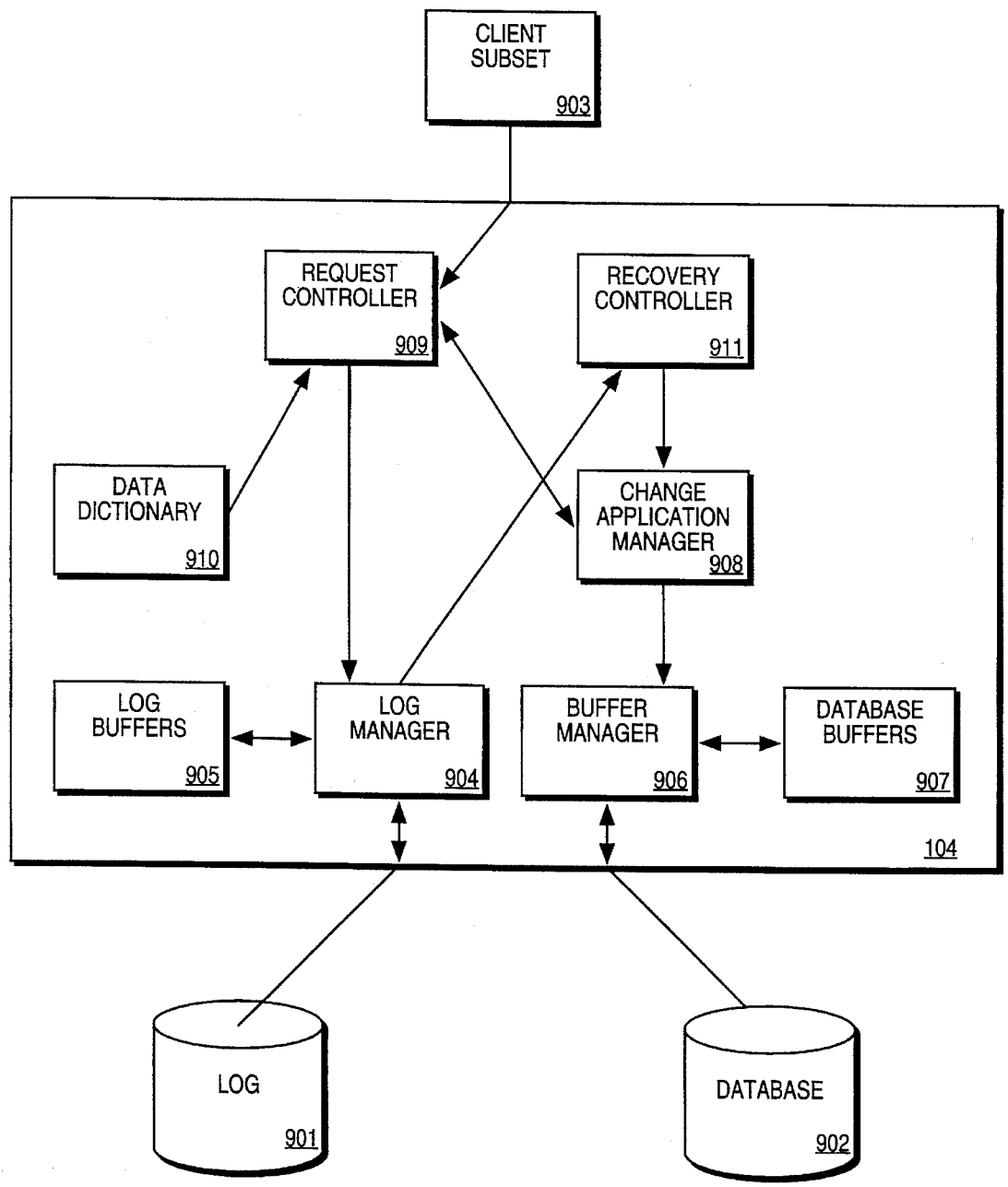
FIG. 9 is a block diagram of the present invention.

A block diagram of the embodiment of the present invention is illustrated in FIG. 9. A client 903 is coupled to a database controller block represented by dashed line 900.

The database controller 900 includes at least one log buffer 905, which contains log data which has not yet been written to the log storage means 901, as well as log data which has been read from the log storage means 901. Log manager 904 provides the communication between the log buffer 905 and the log storage means 901, and also communicates log entries between the request controller 909 and the log buffers 905, and between the recovery controller 911 and the log buffers 905.

The database controller 900 also includes at least one database buffer 907, which contains database areas (typically pages) which have not yet been written to the database 902, as well as areas which have been read from the database 902. Buffer manager 906 provides the communication between the database buffers 907 and the database 902, and also makes database areas available to the change application manager 908, which applies changes to database areas on behalf of the request controller 909 or the recovery controller 911.

A data dictionary 910 provides a source of information about the data in the database, such as the location of the data, the format, and the incarnation number used to label data areas.

Clients submit database modification requests to a request controller 909. The request controller 909 determines what data areas need to be modified, and the appropriate incarnation numbers, from the data dictionary 910. It then creates change requests which are passed to the change application manager 908, for application to areas of database 902, and to the log manager 904, for addition to log 901. The new sequence number to be used is supplied to the request controller 909 by the change application manager 908.

When recovery is necessary, recovery controller 911 obtains appropriate log entires from the log manager 904 (which in turn reads them from the log 901). The changes represented by these log entries are then given to the change application manager 908 for application to the appropriate areas of database 902.

The request controller 909, recovery controller 911, data dictionary 910, log manager 904, change application manager 908 and buffer manager 906 are implemented as a series of executable instructions in a processor means in the preferred embodiment of the present invention.

Thus, a method and apparatus for distributing log I/O activity is described.

TABLE 1

```
-- TYPES
-- composite sequence number identifying change
ChangeNumber: TYPE = RECORD (incarnation: INTEGER, sequence: INTEGER);
  -- sequence is zero for first change of an incarnation
-- data page
Page: TYPE = RECORD ( . . .
                                    changeNumber: ChangeNumber,
                      . . .);
-- description of change sufficient to repeat it
ChangeDescription: TYPE = RECORD ( . . .
                                          address: INTEGER, -- address on disk
                                          changeNumber: ChangeNumber,
                                          . . .);
-- CHANGE AND RECOVERY PROCEDURES
-- Apply a specified change to a particular page.
ChangePage: PROCEDURE (pageNo: INTEGER, incarnation: INTEGER,
  changeDesc: ChangeDescription, newData: BOOLEAN, log: INTEGER)
{
 page: POINTER TO Page;
 -- find page in cache of buffers, physically reading if needed
 page := GetPage(address: pageNo, omitPhysicalRead: newData);
 -- deal with the sequence number
 IF newData THEN page->changeNumber := [incarnation, 1];
 ELSE
 {
   IF page->changeNumber.incarnation <> incarnation THEN ERROR;
   ELSE page->changeNumber.sequence := page->changeNumber.sequence + 1;
 }
 -- make the change in the cached buffer
 ChangePageInBuffer(buffer: page, changeDesc: changeDesc);
 -- log the change
 changeDesc.changeNumber := page->changeNumber;
 changeDesc.address := pageNo;
 LogChange(log: log, address: pageNo,
   changeDesc: changeDesc);
 -- release the buffer containing the page
 ReleasePage(buffer: page);
}
```

TABLE 2

```
  -- Perform recovery using the specified number of logs.
  RecoverData: PROCEDURE (logcount: INTEGER)
  }
   currentLog: INTEGER;
   endedLogs: INTEGER; -- finished logs since last non-finished log
   changeDesc: POINTER TO ChangeDescription;
   page: POINTER TO Page;
   -- This recovery algorithm assumes (a) procedure is entered with
   -- logs open and initialized to first entries; (b) logs are correct
   -- (no missing entries, sequence errors, etc.); (c) no errors
   -- occur during recovery.
   -- begin with the first log
   currentLog := 0; -- start with first log
   endedLogs := 0; -- so far, no logs have reached the end
   WHILE TRUE DO -- for each log
```

TABLE 2-continued

```
{
  -- get current entry in log (on first call, gets first entry)
  changeDesc := GetCurrentChange(log: currentLog);
  WHILE TRUE DO -- for each change in log
  {
    see if we're at the end of the log
    IF changeDesc = NIL THEN
    {
      reached end of this log
      endedlogs := endedLogs + 1;
      GOTO NextLog;
    }
    endedLogs := 0; -- here's at least one log not at the end
    -- get access to the database page
    page := GetPage(address: change->address,
                              omitPhysicalRead: FALSE);
    -- look at incarnation/sequence numbers and decide what to do
    IF changeDesc->changeNumber.incarnation <
       page->changeNumber.incarnation THEN
    {
      -- *** EARLIER incarnation; never apply
      GOTO NextEntryRelease; -- not interesting
    }
    ELSE IF changeDesc->changeNumber.incarnation >
       page->changeNumber.incarnation THEN
    {
      -- *** LATER incarnation; apply if first in incarnation
      IF changeDesc->changeNumber.sequence <> 1 THEN
        GOTO NextLogRelease; -- for entries earlier in curr. inc.
    }
    ELSE -- incarnation numbers are equal
    {
      -- *** SAME incarnation; apply only if next in sequence
      IF changeDesc->changeNumber.sequence <=
         page->changeNumber.sequence THEN
        GOTO NextEntryRelease; -- change has already been applied
      IF changeDesc->changeNumber.sequence >
         page->changeNumber.sequence + 1 THEN
        GOTO NextLogRelease; -- gap in sequence; must try another log
    }
    -- okay to apply this change
    page->changeNumber := changeDesc->changeNumber;
    ChangePageInBuffer(buffer: page, changeDesc: changeDesc);
    -- get next entry
  NextEntryRelease:
    ReleasePage(buffer: page);
  NextEntry:
    changeDesc := GetNextChange(log: currentLog);
  }
NextLogRelease:
  ReleasePage(buffer: page);
NextLog: -- go on to the next log
  IF endedLogs := logCount THEN GOTO Finished;
    currentLog := currentLog + 1;
    IF currentLog = logCount THEN currentLog := 0;
  }
  Finished: RETURN;
}
```

We claim:

1. A method of distributing log entries of transactions initiated by a plurality of clients commonly accessing at least one database, said method comprising the steps of:

dividing said plurality of clients into a plurality of subsets of clients, each of said plurality of clients commonly accessing said at least one database, each of said plurality of clients initiating transactions with said at least one database, each of said subsets including at least one of said plurality of clients;

providing in a first memory means a different transaction log buffer associated with each one of said plurality of subsets of clients; and for each transaction of one of said plurality of clients, storing a transaction log entry in said different transaction log buffer associated with the subset of clients that includes the client that initiated said transaction.

2. The method of claim 1 further including the steps of:

providing in a second memory means a transaction log for each transaction log buffer;

storing said transaction log entry in said transaction log.

3. The method of claim 2 further including the step of providing, in a third memory means, a cache buffer; said cache buffer for storing a copy of a data block from said database upon which a transaction is executed.

4. The method of claim 1 wherein said first memory means comprises a random access memory (RAM).

5. The method of claim 2 wherein said second memory means comprises a disk drive.

6. The method of claim 1 wherein each said transaction is associated with a data block, said data block being a subdivision of said database.

7. The method of claim 6 further including the steps of:
providing a sequence number for each said data block;
incrementing the sequence number associated with said data for each transaction changing said data block.

8. The method of claim 7 further including the steps of:
providing an incarnation number for each said data block:
increasing said incarnation number associated with said data block for each transaction changing said data block, said changing being an initializing of said data block:
setting said sequence number for said data block to an initial value when said incarnation number is increased.

9. A database system comprising:
first storage means for storing data blocks, said data blocks being subdivisions of a database;
a plurality of clients, each client of said plurality of clients commonly accessing said database, each client of said plurality of clients initiating transactions with said database:
first and second subsets of said plurality of clients each of said subsets of clients having at least one client of said plurality of clients, clients of said first subset not being clients of said second subset;
cache buffer means coupled to said first storage means and to said first and second subset of clients, said cache buffer means for storing copies of said areas of data from said first storage means;
first and second transaction log buffer means coupled to said first and second subsets of clients respectively, said first and second transaction log buffer means for temporarily storing a log entry for each transaction initiated by a client of said first and second subset of clients respectively.

10. The database system of claim 9 further including:
first and second log storage means coupled to said first and second log buffer means respectively for permanently storing a log entry for each transaction of said first and second subset of clients respectively.

11. The database system of claim 9 wherein said first storage means comprises a disk drive.

12. The database system of claim 9 wherein said cache buffer means comprise random access memory (RAM).

13. The database system of claim 9 wherein said first and second transaction log buffer means comprise random access memory (RAM).

14. The database system of claim 9 wherein each of said data blocks includes a sequence number.

15. The database system of claim 14 further including sequence number incrementing means for incrementing a sequence number associated with said data block for each transaction changing said data block.

16. The database system of claim 15 wherein each of said data blocks further has an associated incarnation number.

17. The database system of claim 16 further including incarnation number increasing means for increasing an incarnation number associated with a block of data for each transaction initializing said data block.

18. The database system of claim 17 wherein said sequence number incrementing means sets a sequence number of a data block to a first value when the incarnation number of said data block is increased.

19. A method of providing a log of transactions of a plurality of clients accessing a database, said method comprising the steps of:

dividing said plurality of clients into a plurality of subsets of clients all accessing a single data abase, each of said subsets including at least one of said plurality of clients, each of said subsets having an associated log;
initiating a transaction on an original data block of said database by a client of one of said subsets of clients;
providing a copy of said data block to a cache buffer;
executing said transaction on said copy of said block data;
storing a transaction log entry of said transaction in a temporary memory means.

20. The method of claim 19 further including the step of storing said transaction log entry of said transaction in a permanent memory means.

21. The method of claim 20 wherein said permanent memory means comprises a disk drive.

22. The method of claim 19 wherein said temporary memory means comprises a random access memory (RAM).

23. The method of claim 19 further including the step of writing said copy of said data block over said original data block in said database.

24. The method of claim 19 further including the steps of:
providing a sequence number of said data block;
incrementing the sequence number associated with said data block for each transaction changing said data block.

25. The method of claim 24 further including the steps of:
providing an incarnation number for said data block;
increasing said incarnation number associated with said data block for each transaction initializing said data block;
setting said sequence number for said data blocks to an initial value when said incarnation number is increased.

26. A database system comprising:
first storage means for storing data blocks, each of said data blocks having a sequence number
first and second subsets of clients accessing a single database, each of said subsets of clients having at least one client;
cache buffer means coupled to said first storage means and to said first and second subset of clients respectively, said first and second cache buffer means for storing copies of said data blocks from said first storage means;
first and second transaction log buffer means coupled to said first and second subsets of clients respectively, said first and second transaction log buffer means for temporarily storing a log entry for each transaction of said first and second subset of clients respectively;
first and second log storage means coupled to said first and second log buffer means respectively for permanently storing a log entry for each transaction of said first and second subset of clients respectively;
sequence number incrementing means coupled to said first storage means for incrementing a sequence number associated with a data block for each transaction changing said data block.

27. The database system of claim 26 wherein said first storage means comprises a disk drive.

28. The database system of claim 26 wherein said first and second cache buffer means comprise random access memory (RAM).

29. The database system of claim 26 wherein said first and second transaction log buffer means comprise random access memory (RAM).

30. The database system of claim 26 wherein each of said data blocks has an associated incarnation number.

31. The database system of claim 30 further including incarnation number increasing means coupled to said first storage means for increasing an incarnation number associated with said data block for each transaction initializing said data block.

32. The database system of claim 31 wherein said sequence number incrementing means sets a sequence number of said data block to a first value when the incarnation number of said data block is increased.

33. A method of distributing log entries of transactions of a plurality of clients accessing a database, said method comprising the steps of:

dividing said plurality of clients into a plurality of subsets of clients, each of said subsets including at least one of said plurality of clients;

providing in a first memory means a transaction log buffer for each subset of clients;

for each transaction of a client, storing a transaction log entry in a transaction log buffer associated with the subset of clients that includes the client;

providing in a second memory means a transaction log for each transaction log buffer;

storing said transaction log entry in said transaction log.

34. A method of distributing log entries of transactions of a plurality of clients accessing a database, said method comprising the steps of:

dividing said plurality of clients into a plurality of subsets of clients all accessing a single database, each of said subsets including at least one of said plurality of clients;

providing in a first memory means a transaction log buffer for each subset of clients;

for each transaction of a client, storing a transaction log entry in a transaction log buffer associated with the subset of clients that includes the client;

providing in a second memory means a transaction log for each transaction log buffer;

storing said transaction log entry in said transaction log;

providing, in a third memory means, a cache buffer; said cache buffer for storing a copy of a data block from said database upon which a transaction is executed.

35. A method of distributing log entries of transactions of a plurality of clients accessing a database, said method comprising the steps of:

dividing said plurality of clients into a plurality of subsets of clients all accessing a single database, each of said subsets including at least one of said plurality of clients;

providing in a first memory means a transaction log buffer for each subset of clients, said first memory means comprising a random access memory (RAM);

for each transaction of a client, storing a transaction log entry in a transaction log buffer associated with the subset of clients that includes the client;

providing in a second memory means a transaction log for each transaction log buffer;

storing said transaction log entry in said transaction log;

providing, in a third memory means, a cache buffer; said cache buffer for storing a copy of a data block from said database upon which a transaction is executed.

36. A method of distributing log entries of transactions of a plurality of clients accessing a database, said method comprising the steps of:

dividing said plurality of clients into a plurality of subsets of clients all accessing a single database, each of said subsets including at least one of said plurality of clients;

providing in a first memory means a transaction log buffer for each subset of clients, said first memory means comprising a random access memory (RAM);

for each transaction of a client, storing a transaction log entry in a transaction log buffer associated with the subset of clients that includes the client;

providing in a second memory means a transaction log for each transaction log buffer, said second memory means comprising a disk drive;

storing said transaction log entry in said transaction log;

providing, in a third memory means, a cache buffer; said cache buffer for storing a copy of a data block from said database upon which a transaction is executed.

37. A method of distributing log entries of transactions of a plurality of clients accessing a database, said method comprising the steps of:

dividing said plurality of clients into a plurality of subsets of clients all accessing a single database, each of said subsets including at least one of said plurality of clients;

providing in a first memory means a transaction log buffer for each subset of clients, said first memory means comprising a random access memory (RAM);

for each transaction of a client, storing a transaction log entry in a transaction log buffer associated with the subset of clients that includes the client;

providing in a second memory means a transaction log for each transaction log buffer, said second memory means comprising a disk drive;

storing said transaction log entry in said transaction log, each transaction associated with a data block;

providing, in a third memory means, a cache buffer; said cache buffer for storing a copy of a data block from said database upon which a transaction is executed.

38. A database system comprising:

first storage means for storing data blocks, said data blocks being subdivisions of a database, each of said data blocks having a sequence number contained therein;

at least one client coupled to said first storage means, said client for initiating transactions with said data blocks;

cache buffer means coupled to said first storage means and to said client, said cache buffer means for storing copies of said data blocks from said first storage means;

sequence number increasing means coupled to said first storage means for increasing a sequence number of a data block for each transaction changing said data block.

39. The database system of claim 38 wherein said first storage means comprises a disk drive.

40. The database system of claim 38 wherein said cache buffer means comprises random access memory (RAM).

41. The database system of claim 38 wherein each of said data blocks has an associated incarnation number.

42. The database system of claim 41 further including incarnation number increasing means coupled to said first storage means for increasing an incarnation number associated with said data block for each transaction initializing said data block.

43. The database system of claim 42 wherein said sequence number incrementing means sets a sequence number of said data lock to a first value when the incarnation number of said data block is increased.

44. A method of restoring a database comprising the steps of:
   (a) providing a plurality of transaction logs, each of said transaction logs comprising a plurality of transactions, each of said transactions having a sequence number, each of said transaction logs associated with one of a plurality of subsets of clients of said database, each of said subsets of clients comprising at least one client;
   (b) selecting one of said plurality of transaction logs;
   (c) selecting a current transaction in said selected transaction log;
   (d) reading said sequence number of said current transaction;
   (e) comparing said sequence number of said current transaction with a current sequence number;
   (f) performing said current transaction when said sequence number of said current transaction is one more than said current sequence number and applying current transaction to said database;
   (g) setting said current sequence number equal to said sequence number of said current transaction;
   (h) returning to step (c) when said sequence number of said current transaction is less than or equal to said current sequence number and when said sequence number of said current transaction is greater than one more than said current sequence number.

45. The method of claim 44 further including the steps of:
   (i) returning to step (b) when all transactions in a selected transaction log have been selected;
   performing steps (b) through (i) until all transactions of all transaction logs have been selected.

46. The method of claim 44 further including the steps of:
   (i) providing an incarnation number for each transaction of said plurality of transaction logs;
   (j) reading said incarnation number of said current transaction;
   (k) comparing said incarnation number of said current transaction to a current incarnation number;
   (l) returning to step (c) when said incarnation number of said current transaction is less than said current incarnation number;
   (m) returning to step (d) when said incarnation number of said current transaction is greater than said current incarnation number.

47. The method of claim 46 further including the step of: performing steps (b) through (m) until all transactions of all transaction logs have been selected.

48. A method of distributing log entries of transactions initiated by a plurality of clients commonly accessing at least one database, said method comprising the steps of:
   dividing said plurality of clients into a plurality of subsets of clients, each of said plurality of clients commonly accessing said at least one database, each of said plurality of clients initiating transactions with said at least one database, each of said subsets including at least one of said plurality of clients, each said transaction being associated with a data block, said data block being a subdivision of said at least one database;
   providing in a first memory means a different transaction log buffer associated with each one of said plurality of subsets of clients;
   for each transaction of one of said plurality of clients, storing a transaction log entry in said different transaction log buffer associated with the subset of clients that includes the client that initiated said transaction;
   providing a sequence number for each said data block associated with each said transaction;
   incrementing the sequence number associated with said data block for each transaction changing said data block;
   providing an incarnation number for each said data block;
   increasing said incarnation number associated with said data block for each transaction initializing said data block;
   setting said sequence number for said data block to an initial value when said incarnation number is increased;
   wherein said method maintains and distributes log entries of transactions initiated by said plurality of clients prior to a recovery process of said at least one database.

49. The method of claim 48 wherein a storage means comprising a disk drive stores said data block.

50. The method of claim 48 wherein said first memory means is a random access memory (RAM).

51. The database system of claim 50 further comprising:
   first and second log storage means coupled to said first and second log buffer means respectively for permanently storing a log entry for each transaction of said first and second subset of clients respectively.

52. The database system of claim 50 wherein said first storage means comprises a disk drive.

53. The database system of claim 50 wherein said cache buffer means comprise random access memory (RAM).

54. The database system of claim 50 wherein said first and second transaction log buffer means comprise random access memory (RAM).

55. A database system for distributing log entries of transactions initiated by a plurality of clients accessing a single database, said database system comprising:
   first storage means for storing data blocks, said data blocks being subdivisions of a database, each of said data blocks including a sequence number and an incarnation number;
   a plurality of clients, each client of said plurality of clients commonly accessing said database, each client of said plurality of clients initiating transactions with said database;
   first and second subsets of said plurality of clients accessing said at least one database, each of said subsets of clients having at least one client belonging to said plurality of clients, clients of said first subset not being clients of said second subset;
   cache buffer means coupled to said first storage means and to said first and second subset of clients, said cache buffer means for storing copies of said data blocks from said first storage means;
   first and second transaction log buffer means coupled to said first and second subsets of clients respectively, said first and second transaction log buffer means for temporarily storing a log entry for each transaction initiated by a client of said first and second subset of clients respectively;
   sequence number incrementing means for incrementing, for each transaction changing one of said data blocks, said sequence number included in each of said data blocks;
   incarnation number increasing means for increasing, for each transaction initializing said data block, said incarnation number included in each of said data blocks;
   said sequence number incrementing means setting said sequence number of a respective one of said data blocks to a first value when said incarnation number of said respective one of said data blocks is increased;

wherein said database system maintains and distributes log entries of transactions initiated by said plurality of clients prior to a recovery process of said at least one database.

56. A method of distributing log entries of transactions initiated by a plurality of clients commonly accessing at least one database, said method comprising the steps of:

dividing said plurality of clients into a plurality of subsets of clients, each of said plurality of clients commonly accessing said at least one database, each of said plurality of clients initiating transactions with said at least one database, each of said subsets including at least one of the said plurality of clients;

providing in a first memory means a different transaction log buffer associated with each one of said plurality of subsets of clients;

for each transaction of one of said plurality of clients, storing a transaction log entry in said different transaction log buffer associated with the subset of clients that includes the client that initiated the transaction, each transaction being associated with a data block, said data block being a subdivision of said at least one database;

for each said transaction log entry, providing a length of log entry field, an operation code field, a page address field, and incarnation number field, a sequence number field, and a variable length change data field.

57. The method of claim 56 further comprises the steps of:

providing a sequence number for each said data block;

incrementing said sequence number associated with said data block for each transaction changing said data block.

58. The method of claim 57 further including the steps of:

providing an incarnation number for each said data block;

increasing said incarnation number associated with said data block for each transaction initializing said data block.

59. The method of claim 58 further including the step of:

setting said sequence number for said data block to an initial value when said incarnation number is increased.

60. The method of claim 59 wherein said variable length change data field contains data describing changes corresponding to a respective transaction log entry.

61. The method of claim 60 wherein said length of log entry field indicates the length of data contained in said variable length change data field.

62. The method of claim 61 wherein said operation code field indicates a type of a respective transaction log entry.

63. The method of claim 62 wherein said type of said respective transaction log entry is selected from the group consisting of delete type, change type, and write type.

64. The method of claim 63 wherein said page address field indicates the address of a data page corresponding to a respective transaction log entry.

65. The method of claim 64 wherein said incarnation number filed indicates a respective incarnation number of said data page.

66. The method of claim 65 wherein said sequence number field indicates a respective sequence number of said data page.

* * * * *